United States Patent [19]

Snelling

[11] Patent Number: 5,390,013
[45] Date of Patent: Feb. 14, 1995

[54] ULTRASONIC FUSING (ULTRA-FUSE) PROCESS

[75] Inventor: Christopher Snelling, Penfield, N.Y.
[73] Assignee: Xerox Corporation, Stamford, Conn.
[21] Appl. No.: 157,599
[22] Filed: Nov. 24, 1993
[51] Int. Cl.⁶ .......................................... G03G 15/20
[52] U.S. Cl. .................................... 355/285; 430/33; 432/59
[58] Field of Search ............... 355/285, 289, 290, 282; 430/33, 97, 99; 432/59, 227

[56] References Cited

U.S. PATENT DOCUMENTS

| | | | |
|---|---|---|---|
| 3,422,479 | 1/1969 | Jeffee | 15/100 |
| 3,635,762 | 1/1972 | Ott et al. | 134/1 |
| 3,653,758 | 4/1972 | Trimmer et al. | 355/16 |
| 3,713,987 | 1/1973 | Low | 195/127 |
| 3,733,238 | 5/1973 | Long et al. | 156/580 |
| 3,854,974 | 12/1974 | Sato et al. | 117/17 |
| 4,007,982 | 2/1977 | Stange | 355/15 |
| 4,111,546 | 9/1978 | Maret | 355/15 |
| 4,121,947 | 10/1978 | Hemphill | 134/1 |
| 4,363,992 | 12/1982 | Holze, Jr. | 310/323 |
| 4,483,034 | 11/1984 | Anderson | 15/119 A |
| 4,546,722 | 10/1985 | Toda et al. | 118/657 |
| 4,565,439 | 1/1986 | Reynolds | 355/3 FU |
| 4,684,242 | 8/1987 | Schultz | 355/15 |
| 4,794,878 | 1/1989 | Connors et al. | 118/653 |
| 4,833,503 | 5/1989 | Snelling | 355/259 |
| 4,879,564 | 11/1989 | Long | 346/25 |
| 5,010,369 | 4/1991 | Nowak et al. | 355/273 |
| 5,051,780 | 9/1991 | Stelter et al. | 355/285 X |
| 5,081,500 | 1/1992 | Snelling | 355/273 |
| 5,177,552 | 1/1993 | Isogai et al. | 355/285 |
| 5,210,577 | 5/1993 | Nowak | 355/273 |
| 5,243,393 | 9/1993 | Menjo | 355/285 X |

FOREIGN PATENT DOCUMENTS

56-99368 8/1981 Japan .
60-122975 7/1985 Japan .

OTHER PUBLICATIONS

*Patent Abstracts of Japan,* vol. 14, No. 122 (P1017), Abstract Published Mar. 7, 1990, For 01-316780.
*Patent Abstracts Of Japan,* vol. 7, No. 96 (P193), Abstract Published Apr. 22, 1983, For 58-21775.
Union of Soviet Socialist Republic Patent No. 301679, Apr. 21, 1969.
French Publication No. 2280115 filed Jul. 22, 1975.
Xerox Disclosure Journal "Floating Diaphragm Vacuum Shoe", vol. 2, No. 6, Nov./Dec. 1977.

*Primary Examiner*—R. L. Moses

[57] ABSTRACT

An ultrasonic fuser for fixing toner images to substrates utilizes an acoustic transducer or resonator in the form of an ultrasonic welding horn and a viscoelastic member. As toner images carried on a substrate are moved between the resonator and the viscoelastic member heat energy is created both in the toner particles forming the images and the viscoelastic member. The heat energy created in the viscoelastic member is transferred to the toner images through intimate contact therewith and together with the heat generated in the toner serves to elevate the toner to its fusing temperature.

21 Claims, 3 Drawing Sheets

ULTRASONIC FUSING (ULTRA-FUSE) PROCESS

BACKGROUND OF THE INVENTION

This invention relates to the fusing of toner images and more particularly to a toner image fuser that exhibits a high degree of thermal energy efficiency, in that, heat energy is generated substantially only where it is needed for effective fusing.

In the art of xerography or other similar image creation arts, a latent electrostatic image is formed on a charge-retentive surface which may comprise a photoconductor which generally comprises a photoconductive insulating material adhered to a conductive backing. When the image is formed on a photoconductor, the photoconductor is first provided with a uniform charge after which it is exposed to a light image of an original document to be reproduced. The latent electrostatic images, thus formed, are rendered visible by applying any one of numerous pigmented resins specifically designed for this purpose.

It should be understood that for the purposes of the present invention, which relates to rendering permanent powder or toner images, the latent electrostatic image may be formed by means other than by the exposure of an electrostatically charged photosensitive member to a light image of an original document. For example, the latent electrostatic image may be generated from information electronically stored or generated, and the digital information may be converted to alphanumeric images by image generation electronics and optics. However, such image generation electronic and optic devices form no part of the present invention.

In the case of a reusable photoconductive surface, the pigmented resin, more commonly referred to as toner, which forms the visible images is transferred to a substrate such as plain paper. After transfer the images are made to adhere to the substrate using a fuser apparatus.

To date, the use of simultaneous heat and contact pressure using a pair of nip forming rollers for fusing toner images has been the most widely accepted commercially. Heretofore, it has been necessary with the foregoing type of fuser to heat the fuser roll or rolls not only when images are being fused but also during standby when images are not being fused. This is because of the long delay that would be required to elevate the fuser to a proper operating temperature if the heat supply were turned off during standby, the long delay being due to the relatively large mass that has to be brought up to the fusing temperature. Moreover, the need for the use of standby power dissipation renders such fusers thermally inefficient. Such delays would not be tolerated by the user even though operating the fuser in such a manner would eliminate a substantial waste of energy and reduce the effect thereof on ambient conditions.

Elimination of fuser standby power has been accomplished in prior art devices such as flash fusers and cold pressure fusers. Both of these types of fusers, however, exhibit other drawbacks. For example, cold pressure fusers exhibit poor quality images. Flash fusers create undesirable effluents and they work very poorly with colored toners, especially the lighter colored ones. Also, the optical density of flash fused images is considered unsatisfactory.

In addition to the aftermentioned types of fusers designed to obviate the problems noted, "instant on" fusers such as disclosed in U.S. Pat. No. 4,565,439 granted to Scott D. Reynolds on Jan. 21, 1986 have been contemplated. As disclosed therein, that fuser comprises a low mass belt heated by an external heat source positioned remotely from a fuser nip through which substrates carrying toner images are passed.

Accordingly, I have provided, as disclosed herein, a fuser that exhibits high thermal efficiency and that can be satisfactorily operated without the employment of standby power. To this end, an acoustic transducer in the form of an ultrasonic welding horn is employed.

Ultrasonic welding and other types of vibrating devices have been disclosed for use in different applications or functions in connection with xerographic imaging. For example, such devices have been used for the transfer and development of toner images as well as residual toner removal from a charge retentive surface. Examples of their use in the transfer and development of toner images and the removal of residual toner particles can be found in the following patents:

U.S. Pat. No. 5,210,577 granted to William J. Nowak on May 11, 1993 discloses an imaging device including a non-rigid member with a charge retentive surface moving along an endless path, an arrangement for creating a latent image on the charge retentive surface, a developer to develop the latent image with toner, a transfer arrangement electrostatically transferring the developed toner image to a copy sheet, and a resonator for enhancing toner release from the charge retentive surface, producing relatively high frequency vibratory energy and having a portion adapted for contact across the non-rigid member, generally transverse to the direction of movement of the non-rigid member.

Union of Soviet Socialist Republic Patent No. 301679 published on Apr. 21, 1969 in the name of Steshets et al discloses a roll for fusing toner images which roll is an annular vibrator fabricated from magnetostrictive material (e.g. nickel, barium, titanium, etc.) with a winding situated in such a way that the vibrator emits vibrations radially. At the points of contact, significant pressure and acceleration are developed so that the abrasive magnetographic developer is easily forced into the paper.

French Publication No. 2 280 115 based on patent application Ser. No. 75 22768 filed on Jul. 22, 1975 discloses a transfix apparatus wherein surfaces placed in mutual contact are subjected to ultrasonic vibrations.

U.S. Pat. No. 5,081,500 granted to Christopher Snelling on Jan. 14, 1992 discloses a method and apparatus for using vibratory energy to reduce transfer deletions in electrophotographic imaging. At a transfer station, a resonator suitable for generating vibratory energy is arranged in line contact with the back side of the charge retentive surface, to uniformly apply vibratory energy to the charge retentive member. Toner is released from the electrostatic and mechanical forces adhering it to the charge retentive surface at the line contact position. In those areas of the latent image characterized by non-intimate contact of the sheet with the charge retentive surface, toner is transferred across the gap by the electrostatic transfer process, despite the fact that the charge on the paper would not normally be sufficient to attract toner to the sheet from the charge retentive surface.

U.S. Pat. No. 4,111,546 to Maret proposes to enhance residual toner removal from an imaging surface by applying high frequency vibratory energy to an imaging surface with a vibratory member, coupled to an imaging surface at the cleaning station. The vibratory member described is a horn arrangement excited with a piezoelectric transducer (Piezoelectric element) at a frequency in the range of about 20 kilohertz.

U.S. Pat. No. 4,684,242 to Schultz describes a cleaning apparatus that provides a magnetically permeable cleaning fluid held within a cleaning chamber, wherein an ultrasonic horn driven by piezoelectric transducer element is coupled to the backside of the imaging surface to vibrate the fluid within the chamber for enhanced cleaning.

U.S. Pat. No. 4,007,982 to Stange provides a cleaning blade with an edge vibrated at a frequency to substantially reduce the frictional resistance between the blade edge and the imaging surface, preferably at ultrasonic frequencies.

U.S. Pat. No. 4,121,947 to Hemphill provides an arrangement which vibrates a photoreceptor to dislodge toner particles by entraining the photoreceptor about a roller, while rotating the roller about an eccentric axis.

Xerox Disclosure Journal "Floating Diaphragm Vacuum Shoe, by Hull et al., Vol. 2, No. 6, November/December 1977 shows a vacuum cleaning shoe wherein a diaphragm is oscillated in the ultrasonic range.

U.S. Pat. No. 3,653,758 to Trimmer et al suggests that transfer of toner from an imaging surface to a substrate in a non contacting transfer electrostatic printing device may be enhanced by applying vibratory energy to the backside of an imaging surface at the transfer station.

U.S. Pat. No. 4,546,722 to Toda et al., U.S. Pat. No. 4,794,878 to Connors et al., and U.S. Pat. No. 4,833,503 to Snelling disclose use of a piezoelectric transducer driving a resonator for the enhancement of development within a developer housing.

Japanese Published Patent Appl. 62-195685 suggests that imagewise transfer of photoconductive toner, discharged in imagewise fashion, from a toner retaining surface to a substrate in a printing device may be enhanced by applying vibratory energy to the backside of the toner retaining surface.

U.S. Pat. No. 3,854,974 to Sato et al. discloses vibration simultaneous with transfer across pressure engaged surfaces.

Resonators for applying vibrational energy to some other member are known, for example in U.S. Pat. No. 4,363,992 to Holze, Jr. which shows a horn for a resonator, coupled with a piezoelectric transducer device supplying vibrational energy, and provided with slots partially through the horn for improving non uniform response along the tip of the horn. U.S. Pat. No. 3,113,225 to Kleesattel et al. describes an arrangement wherein an ultrasonic resonator is used for a variety of purposes, including aiding in coating paper, glossing or compacting paper and as friction free guides. U.S. Pat. No. 3,733,238 to Long et al. shows an ultrasonic welding device with a stepped horn. U.S. Pat. No. 3,713,987 to Low shows ultrasonic agitation of a surface, and subsequent vacuum removal of released matter.

Coupling of vibrational energy to a surface has been considered in Defensive Publication T893,001 by Fisler which shows an ultrasonic energy creating device arranged in association with a cleaning arrangement in a xerographic device, and coupled to the imaging surface via a bead of liquid through which the imaging surface is moved. U.S. Pat. No. 3,635,762 to Ott et al. and U.S. Pat. No. 3,422,479 to Jeffee show a similar arrangement where a web of photographic material is moved through a pool of solvent liquid in which an ultrasonic energy producing device is provided. U.S. Pat. No. 4,483,034 to Ensminger shows cleaning of a xerographic drum by submersion into a pool of liquid provided with an ultrasonic energy producing device.

U.S. Pat. No. 3,190,793 Starke shows a method of cleaning paper making machine felts by directing ultrasonic energy through a cleaning liquid in which the felts are immersed.

U.S. Pat. No. 4,879,564 granted to Michael E. Long on Nov. 7, 1989 relates to the use of ultrasonic energy to heat a dye image in a receiver to cause such dye to fuse into the receiver.

U.S. Pat. No. 5,010,369 granted to Nowak et al on Apr. 23, 1991 relates to an electrophotographic device of the type including a flexible belt charge retentive member, driven along an endless path through a series of processing stations that create a latent image on the charge retentive surface, develop the image with toner, and bring a sheet of paper or other transfer member into intimate contact with the charge retentive surface at a transfer station for electrostatic transfer of toner from the charge retentive surface to the sheet. For the enhancement of toner release from a surface at any of the processing stations, a resonator suitable for generating vibratory energy is arranged in line contact with the back side of the charge retentive surface, to uniformly apply vibratory energy to the charge retentive member. The resonator includes a horn, a continuous support member, and a continuous vibration producing member that drives the horn at a resonant frequency to apply vibratory energy to the belt. The horn includes a platform or base portion, a horn portion extending therefrom, and having a contacting tip. The horn is segmented, through the contacting tip to the platform portion, into a plurality of elements which each act more or less individually. In alternative embodiments, the vibration producing member that drives the horn, and/or the support member may also be segmented in a corresponding manner.

All the references cited herein are specifically incorporated by reference for their teachings.

BRIEF SUMMARY OF THE INVENTION

In accordance with the present invention, an ultrasonic fuser is provided. The ultrasonic fuser utilizes an acoustic transducer in the form of an ultrasonic welding horn. In the ultrasonic fusing of toner images according to the present invention, heat is generated both in the toner material forming the image and a viscoelastic support member which contacts the toner images during the fusing process. The support member is fabricated from a material having a high loss tangent (tan delta) and is therefore capable of dissipating a large percentage of heat energy generated therein. Loss tangent is defined as the ratio of a material's viscous modulus to its elastic modulus. Heat generation in the viscoelastic member is created through acoustic distortions in viscoelastic member. Thus, the acoustic waves absorbed by the viscoelastic materials, including the toner, are converted to heat energy. The heat generated in the support member is transferred to the toner through intimate contact therewith. The heat transferred by the viscoelastic material and that generated in the toner material serve to soften the toner to the degree necessary for efficient fusing of the toner images.

The viscoelastic material is used to simultaneously serve as both a heat source and as a surface to provide uniform pressure to drive softened toner into the paper structure. Heat is generated in the viscoelastic material by virtue of its attenuation of acoustic energy provided by the acoustic transducer vibrating against the backside of the paper. The unfused toner powder image on the front side of the paper is initially mechanically captured between the paper and the viscoelastic material surface to prevent dispersion of the of the toner particles. As the heat energy generated in the viscoelastic material is transferred to the toner, the toner softens and extrudes or wicks into the paper due to the normal force produced by the acoustic horn tip pushing against the backside of the paper.

Typically, the support member includes an energy absorbing, viscoelastic polymer body such as that disclosed in U.S. Pat. No. 4,346,205 granted to Hiles et al on Aug. 24, 1982. As disclosed in the '205 patent, the polymer comprises a thermoplastic polyurethane elastomer having a high loss tangent. Other polyurethane compounds may be suitable for fusing toner images. For example, Mearthane Products Corp., 70 Glen Road, Cranston, R.I, 02920 manufactures a viscoelastic polymer known as Mearthane TM which is similar to Sorbothane TM.

DETAILED DESCRIPTION OF THE PREFERRED EMBODIMENT OF THE INVENTION

Figure 1:
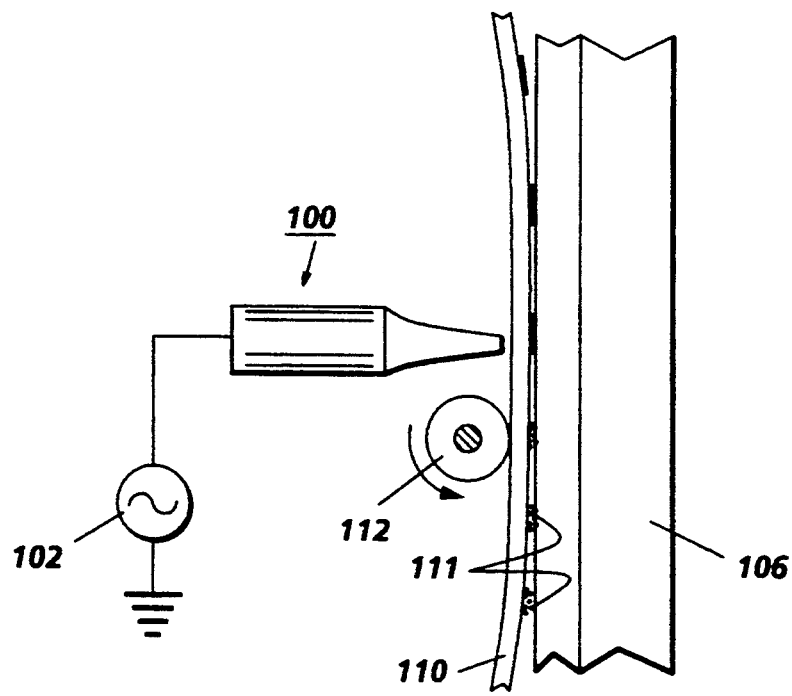
FIG. 1 is a schematic illustration of ultrasonic fusing of toner images to a copy substrate.

Referring now to the drawings, where the showings are for the purpose of describing a preferred embodiment of the invention and not for limiting same, the various processing stations employed in the reproduction machine illustrated in FIG. 4 will be described only briefly. It will no doubt be appreciated that the various processing elements also find advantageous use in electrophotographic printing applications from an electronically stored original.

A reproduction machine in which the present invention finds advantageous use utilizes a photoreceptor belt 10. Belt 10 moves in the direction of arrow 12 to advance successive portions of the belt sequentially through the various processing stations disposed about the path of movement thereof.

Belt 10 is entrained about stripping roller 14, tension roller 16, idler rollers 18, and drive roller 20. Drive roller 20 is coupled to a motor (not shown) by suitable drive means such as a belt.

Belt 10 is maintained in tension by a pair of springs (not shown) resiliently urging tension roller 16 against belt 10 with the desired spring force. Both stripping roller 14 and tension roller 16 are rotatably mounted. These rollers are idlers which rotate freely as belt 10 moves in the direction of arrow 12.

Figure 4:
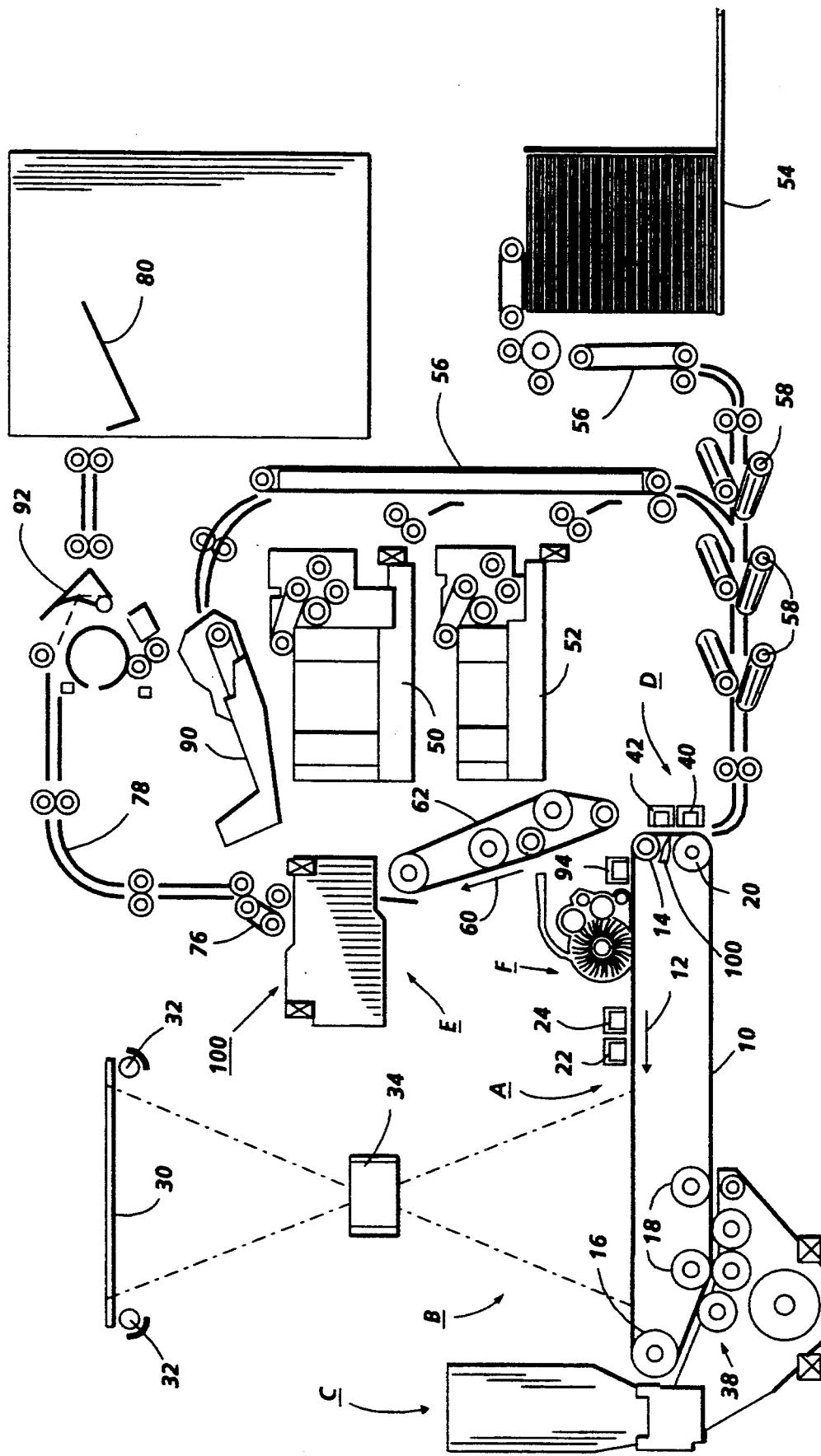
FIG. 4 is a schematic elevational view depicting an electrophotographic printing machine incorporating the present invention.

With continued reference to FIG. 4, initially a portion of belt 10 passes through charging station A. At charging station A, a pair of corona devices 22 and 24 charge photoreceptor belt 10 to a relatively high, substantially uniform negative potential.

At exposure station B, an original document is positioned face down on a transparent platen 30 for illumination with flash lamps 32. Light rays reflected from the original document are reflected through a lens 34 and projected onto a charged portion of photoreceptor belt 10 to selectively dissipate the charge thereon. This records an electrostatic latent image on the belt which corresponds to the informational area contained within the original document.

Thereafter, belt 10 advances the electrostatic latent image to development station C. At development station C, a developer unit 38 advances one or more colors or types of developer mix (i.e. toner and carrier granules) into contact with the electrostatic latent image. The latent image attracts the toner particles from the carrier granules thereby forming toner images on photoreceptor belt 10. As used herein, toner refers to finely divided dry ink, and toner suspensions in liquid.

Belt 10 then advances the developed latent image to transfer station D. At transfer station D, a sheet of support material such as a paper copy sheet is moved into contact with the developed latent images on belt 10. First, the latent image on belt 10 is exposed to a pre-transfer light from a lamp (not shown) to reduce the attraction between photoreceptor belt 10 and the toner image thereon. Next, corona generating device 40 charges the copy sheet to the proper potential so that it is tacked to photoreceptor belt 10 and the toner image is attracted from photoreceptor belt 10 to the sheet. After transfer, a corona generator 42 charges the copy sheet with an opposite polarity to detack the copy sheet for belt 10, whereupon the sheet is stripped from belt 10 at stripping roller 14. The support material may also be an intermediate surface or member, which carries the toner image to a subsequent transfer station for transfer to a final substrate. These types of surfaces are also charge retentive in nature. Further, while belt type members are described herein, it will be recognized that other substantially non-rigid or compliant members may also be used with the invention.

Sheets of support material are advanced to transfer station D from supply trays 50, 52 and 54, which may hold different quantities, sizes and types of support materials. Sheets are advanced to transfer station D along conveyor 56 and rollers 58. After transfer, the sheet continues to move in the direction of arrow 60 onto a conveyor 62 which advances the sheet to fusing station E.

Fusing station E includes a fuser assembly, indicated generally by the reference numeral 70, which permanently affixes the transferred toner images to the sheets. Preferably, fuser assembly 70 includes a relatively high frequency acoustic or ultrasonic resonator 100 (FIG. 1).

After fusing, copy sheets bearing fused images are directed through decurler 76. Chute 78 guides the advancing sheet from decurler 76 to catch tray 80 or a finishing station for binding, stapling, collating etc. and removal from the machine by the operator. Alternatively, the sheet may be advanced to a duplex tray 90 via duplex gate 92 from which it will be returned to the processor and conveyor 56 for receiving second side images.

A pre-clean corona generating device 94 is provided for exposing the residual toner and contaminants (hereinafter, collectively referred to as toner) to corona to thereby narrow the charge distribution thereon for more effective removal at cleaning station F. It is contemplated that residual toner remaining on photoreceptor belt 10 after transfer will be reclaimed and returned to the developer station C by any of several well known reclaim arrangements.

As thus described, a reproduction machine in accordance with the present invention may be any of several well known devices. Variations may be expected in specific processing features, paper handling and control arrangements without affecting the present invention.

With reference to FIG. 1, the basic fusing concept of the present invention is illustrated schematically. As noted hereinabove, the fuser assembly of the present invention comprises the relatively high frequency acoustic or ultrasonic resonator 100 driven by an A.C. source 102 operated at a frequency in the range of 20 Khz to 40 Khz. The fuser assembly 70 further comprises a heat transfer member 104 carried by a rigid support member 106. The rigid support carrying the member 104 is adapted to be moved relative to the resonator 100 simultaneously with the movement of a copy sheet 110 while being contacted by the resonator. The copy sheet 110 carries toner images 111 transferred thereto from the belt 10. A pressure roll 112 serves to mechanically capture the toner images between the member 104 and the copy sheet 111 until the toner has been softened such that it coalesces.

The heat transfer member 104 is fabricated from a material having a high loss tangent (tan delta) and is therefore capable of developing and dissipating a large percentage of heat energy. Loss tangent is defined as the ratio of a material's viscous modulus to its elastic modulus. Heat generation in the viscoelastic member is created through acoustic distortions in the viscoelastic member.

In the ultrasonic fusing of toner images according to the present invention, heat is generated both in the toner material forming the images 111 and the viscoelastic member 104 which contacts the toner images on the copy sheet 110 during the fusing process. Thus, the acoustic waves absorbed by the viscoelastic materials, including the toner, are converted to heat energy. The heat generated in the high loss tangent member 104 is transferred to the toner through intimate contact therewith. The heat transferred by the viscoelastic material and that generated in the toner material serve to soften thereby causing the toner coalesce to the degree necessary for efficient fusing of the toner images.

The viscoelastic member is used to simultaneously serve as both a heat source and as a surface to provide uniform pressure to drive softened toner into the copy sheet structure which may by way of example comprise plain paper. Heat is generated in the viscoelastic material by virtue of its attenuation of acoustic energy provided by the acoustic transducer vibrating against the backside of the paper. The unfused toner powder image on the front side of the paper is initially mechanically captured between the paper and the viscoelastic material surface to prevent dispersion of the toner particles. As the heat energy generated in the viscoelastic material is transferred to the toner, it becomes soft and coalesces and extrudes or wicks into the paper due to the normal force produced by the acoustic horn tip pushing against the backside of the paper.

Typically, the support member includes an energy absorbing, viscoelastic polymer body such as that disclosed in U.S. Pat. No. 4,346,205 granted to Hiles et al on Aug. 24, 1982. As disclosed in the '205 patent, the polymer comprises a thermoplastic polyurethane elastomer having a high loss tangent. Other polyurethane compounds may be suitable for fusing toner images. For example, Mearthane Products Corp., 70 Glen Road, Cranston, R.I, 02920 manufactures a viscoelastic polymer known as Mearthane TM which is similar to Sorbothane TM.

Figure 2:
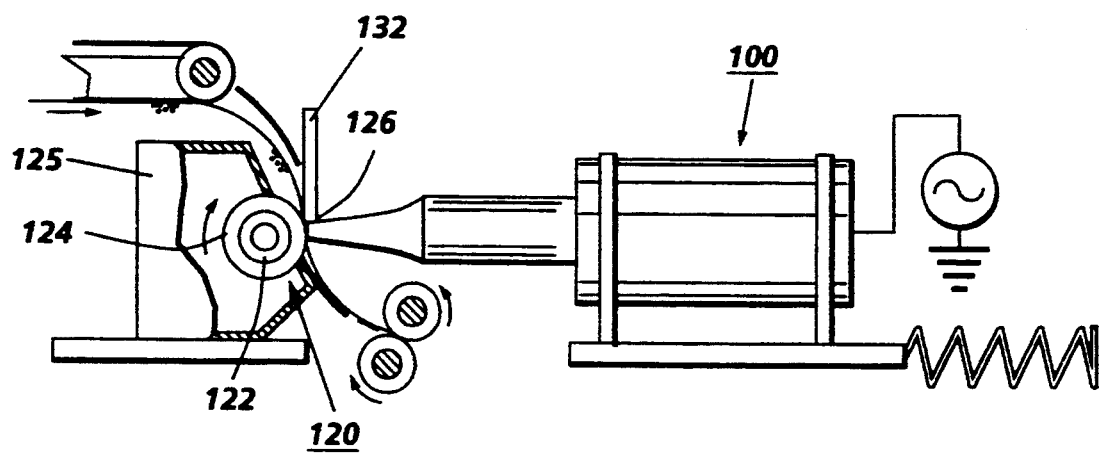
FIG. 2 is a schematic illustration of an ultrasonic fuser according to the invention.

As illustrated in FIG. 2, a fuser assembly 70 comprises a fuser roll 120 comprising a rigid support member 122 to which is adhered a layer 124 of viscoelastic material. As disclosed therein, the fuser roll is supported for rotation by a frame member 125 such that a nip 126 is formed between its surface and the tip of the ultrasonic resonator 100. The fuser roll rotates in the clockwise direction as viewed in FIG. 2. As the toner images are carried through the nip by the copy sheet, the toner temperature is elevated by means of both the resonator and heat energy transferred thereto by the viscoelastic layer 124. Acoustic distortion of the viscoelastic material is effected only in the nip area. Thus, a high degree of thermal energy efficiency is realized, in that, heat energy is generated substantially only where it is needed for effective fusing. A copy sheet feed blade 132 replaces the pressure roll 112 for mechanically capturing the toner images until the toner forming the images coalesces.

Reduction to practice of the the ultrasonic fusing process disclosed herein has been achieved using a Sorbothane viscoelastic polymer. Both 20 Khz and 40 Khz acoustic transducers were employed successfully. The amplitudes of acoustic motions used are believed to be on the order of several microns. The apparent degree of toner fix observed appears to be very high according to a standard "crease test". Microscopic examination revealed that ultrasonically fused toner seems to extrude around paper fibers. Therefore, in the areas creased, the toner remained with the paper fibers instead of flaking off.

In the apparatus used, a four inch wide ultrasonic welding horn operating at 20 Khz was used as the transducer. Toner images were fused at a process speed of 1–2 ips by driving the Sorbothane fuser roll 120. Silicone oil was found to be helpful in reducing the adhesion of the fused toner/paper to the roll. It will be appreciated that full width horn is contemplated for use in commercial printers.

Ultrasonic fusing according to the present invention appears to offer several advantages over prior art fusing techniques. For example, heat generation locally within and adjacent to the toner itself indicates that a high thermal energy efficiency can be achieved. Also, the low thermal mass involved simplifies the process control and enables true "instant-on" fusing. While toners having inherent acoustic loss properties should be even more efficiently fused using the disclosed process, the process is useful with essentially all heat fusible toners.

Figure 3:
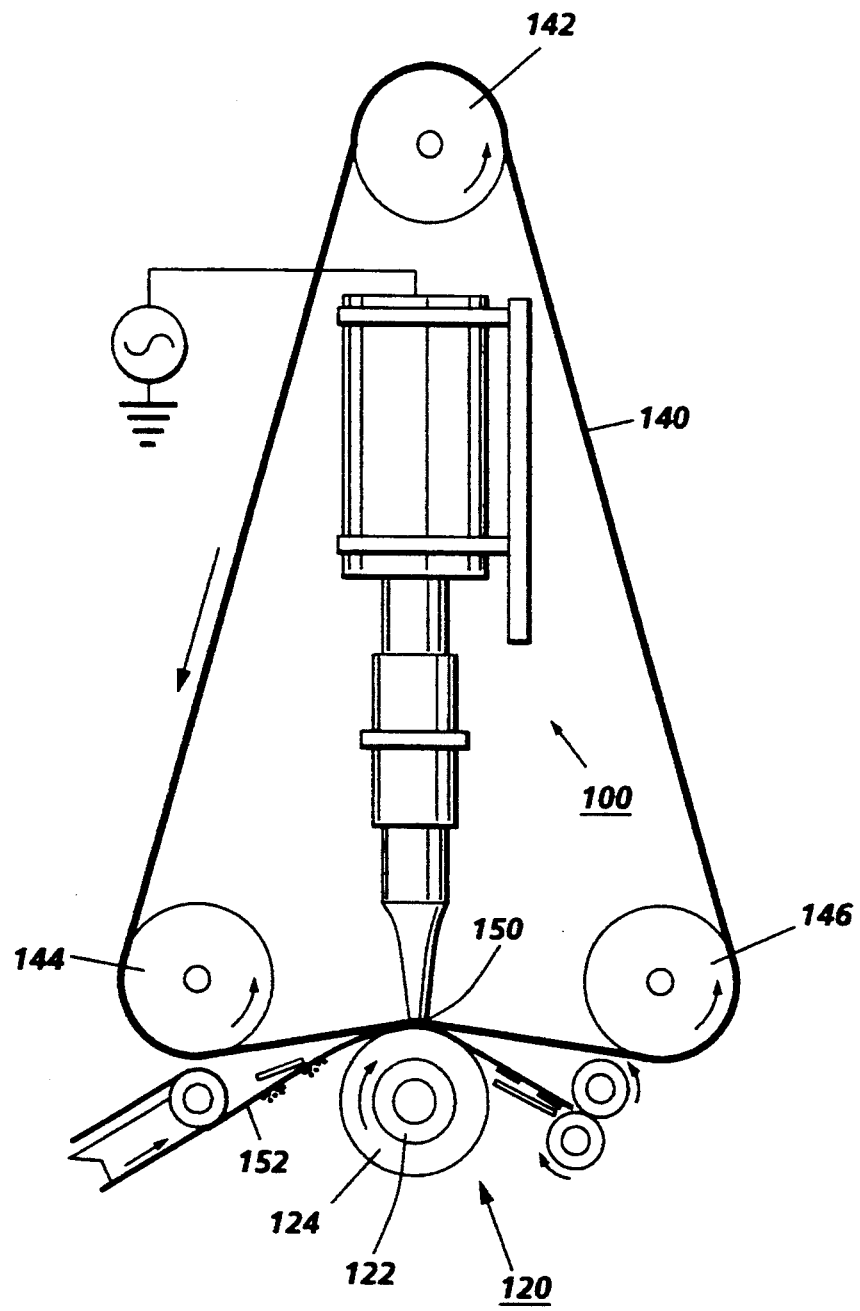
FIG. 3 is a modified embodiment of the ultrasonic fuser of FIG. 2.

A modified embodiment of the device illustrated in FIG. 2, as depicted in FIG. 5, comprises an ultrasonic resonator 100 supported within a loop delineated by an endless belt member 140 entrained about a pair of idler rollers 142 and 144 and a drive roller 146. The drive roller 146 serves to move the belt member in the counterclockwise direction by a drive arrangement, not shown, as viewed in FIG. 3. A pressure roll 124 is supported in contact with the belt 140 to form a nip 150 through which a copy substrate 152 can be moved. The substrate 152 has unfused toner images on the side thereof that contacts the pressure roll 120. The toner images are fused in the manner fused with the arrangement disclosed in FIG. 2.

What is claimed is:

1. A method of fusing toner images to substrates such as plain paper, including the steps of:

heating toner images from a side of a substrate opposite a side thereof having said toner images electrostatically adhered thereto; and simultaneously heating only a portion of a member other than said substrate which portion of a member is heated in a nip between said substrate and said member as it contacts said toner images for supplying additional heat thereto.

2. The method according to claim 1 wherein said step of heating toner images includes using an acoustic transducer.

3. The method according to claim 2 wherein the step of simultaneously heating comprises heating a viscoelastic member using said acoustic transducer.

4. The method according to claim 3 wherein step of using an acoustic transducer includes energizing said acoustic transducer using an AC voltage supply, said voltage supply being driven at a frequency in the range of 20 to 40 Khz.

5. The method according to claim 2 wherein the step of simultaneously heating comprises heating a member having a high loss tangent.

6. The method according to claim 5 wherein step of using an acoustic transducer includes energizing said acoustic transducer using an AC voltage supply, said voltage supply being driven at a frequency in the range of 20 to 40 Khz.

7. The method according to claim 1 wherein said step of simultaneously heating a member includes heating an external layer of a fuser roll.

8. The method according to claim 7 wherein said step of heating an external layer of a fuser roll includes heating a layer comprising a viscoelastic material.

9. The method according to claim 7 wherein said step of heating an external layer of a fuser roll includes heating a layer having a high loss tangent.

10. Apparatus for fusing toner images to substrates such as plain paper, said apparatus comprising:

means for heating toner images from a side of a substrate opposite a side thereof having said toner images electrostatically adhered thereto; and means for simultaneously heating only a portion of a member other than said substrate which portion of a member is heated in a nip between said substrate and said member and as it contacts said toner images for supplying additional heat thereto.

11. Apparatus according to claim 10 means for heating toner images comprises an acoustic transducer.

12. Apparatus according to claim 11 wherein said member comprises a viscoelastic member heated by said acoustic transducer.

13. Apparatus according to claim 12 including an AC voltage supply for energizing said acoustic transducer at a frequency in the range of 20 to 40 Khz.

14. Apparatus according to claim 11 wherein said member comprises a material heated by said acoustic transducer and having a high loss tangent.

15. Apparatus according to claim 14 including an AC voltage supply for energizing said acoustic transducer at a frequency in the range of 20 to 40 Khz.

16. Apparatus according to claim 10 wherein means for simultaneously heating a member includes means for heating an external layer of a fuser roll.

17. Apparatus according to claim 16 wherein said external layer comprises a viscoelastic material.

18. Apparatus according to claim 16 wherein said external layer comprises a material having a high loss tangent.

19. In an imaging device having a charge retentive surface moving along an endless path, means for producing a toner image on the charge retentive surface, corona generating means for providing non-contacting electrostatic transfer of the developed toner image within a transfer field to a second surface in contact with said charge retentive surface and means for fusing toner images to the second surface including:

means for heating toner images from a side of a substrate opposite a side thereof having said toner images electrostatically adhered thereto; and means for simultaneously heating only a portion of a member other than said substrate which portion of a member is heated in a nip between said substrate and said members as it contacts said toner images for supplying additional heat thereto.

20. Apparatus according to claim 19 wherein means for simultaneously heating a member includes means for heating an external layer of a fuser roll.

21. Apparatus according to claim 19 wherein said external layer comprises a material having a high loss tangent.

* * * * *